J. F. O'CONNOR.
SHOCK ABSORBER FOR VEHICLES.
APPLICATION FILED MAR. 4, 1918.

1,307,311.

Patented June 17, 1919.

INVENTOR.
John F. O'Connor
BY Geo. J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBER FOR VEHICLES.

1,307,311.  Specification of Letters Patent.  Patented June 17, 1919.

Application filed March 4, 1918.   Serial No. 220,233.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers for Vehicles, of which the following is a full, clear, concise, and exact description, reference being had to the accompanying drawings, forming a part of this specification.

This invention relates to improvements in shock absorbers for vehicles.

The object of the invention is to provide a relatively inexpensive and simple shock absorber for automobiles and the like and wherein the capacity is automatically varied in accordance with the relative movements between the parts of the vehicle to which the shock absorber is attached.

Figure 1:
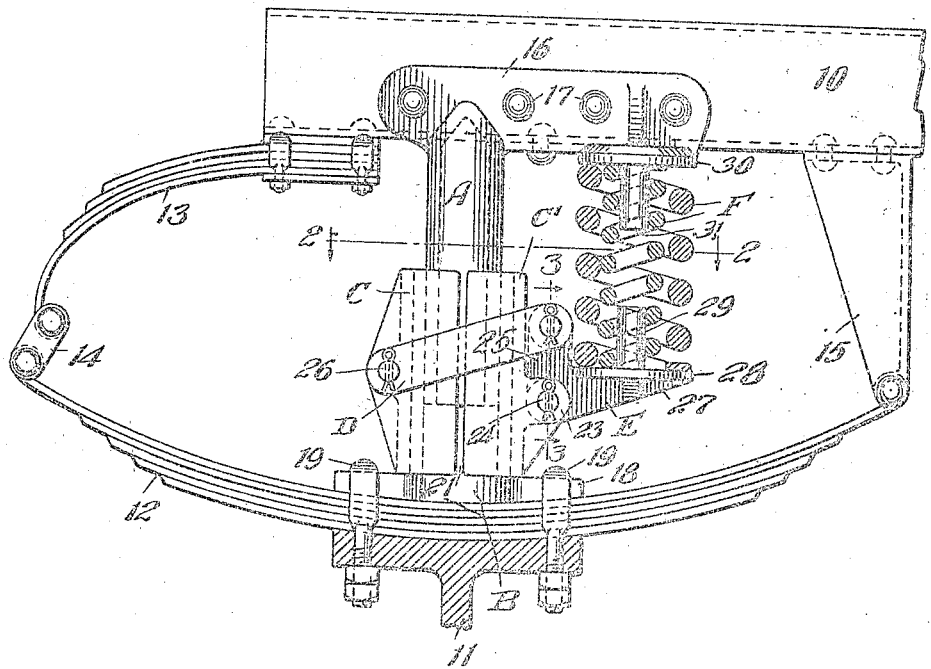
Figure 2:
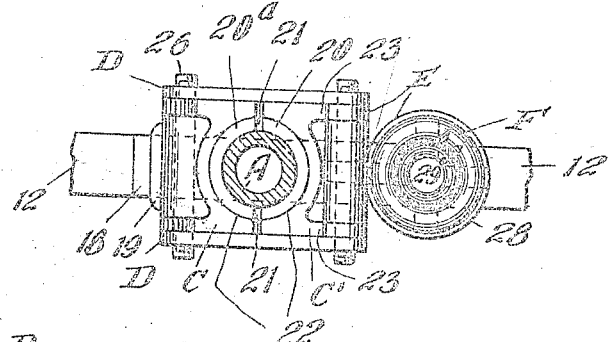
Figure 3:
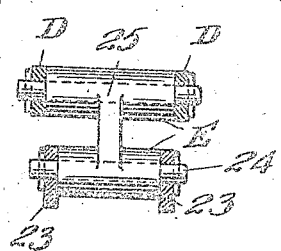

In the drawing forming a part of this specification, Figure 1 is a part side elevation, part sectional view of a portion of an automobile chassis and axle showing my improvements in connection therewith. Fig. 2 is a horizontal, sectional view, taken substantially on the line 2—2 of Fig. 1. And Fig. 3 is a detail, sectional view, taken on the line 3—3 of Fig. 1.

In said drawing, 10 denotes a portion of an automobile chassis, 11 an axle, 12 a semi-elliptic spring, 13 a quarter-elliptic spring, 14 a compensating link connecting the semi-elliptic and quarter-elliptic springs, and 15 a depending bracket secured to the chassis and to which one end of the spring 12 is attached.

The improved shock absorber is adapted to be interposed between the chassis 10 and the axle 11 to cushion the excessive shocks. As shown, said shock absorber includes a plunger A, a telescoping sleeve B, clamping blocks C—C', pressure-applying links D—D, bell-crank E, and spring F.

The plunger A, which is preferably made hollow to save metal and reduce weight, is preferably of substantially cylindrical form and forms an integral part of a bracket 16 secured to the chassis 10 by any suitable means, such as the rivets 17. The telescoping sleeve B includes a base flange 18 by which it is secured to the spring 12 and axle 11 through the intermediary of the usual spring clips 19—19. Extending upwardly from the base plate 18, is the sleeve proper 20—20ª, the parts 20 and 20ª being substantially semi-cylindrical and separated by diametrically disposed slots 21—21. In actual practice, the sleeve 20—20ª may be formed integrally with the base plate 18 and originally made as a continuous cylinder and a saw-cut made so as to form the two halves in order to permit the necessary flexibility for the gripping action, as hereinafter described.

The clamping blocks C—C' are curved on their inner faces, as indicated at 22—22, to fit the exterior of the split sleeve 20—20ª. The blocks C—C' may be made in the form of castings. The clamping block C' is provided with a pair of perforated ears 23—23 between which the bell-crank E is pivoted on the pin 24. The vertically extending arm 25 of the bell-crank has pivotally connected thereto the links D—D, the opposite ends of said links D—D, which straddle the clamping blocks C—C' being pivotally connected, as indicated at 26, to the clamping block C. The horizontal arm 27 of the bell-crank E is provided with a suitable flanged enlargement 28 which forms a lower seat for the two-coil spring F, and in order to hold the spring F in proper position, an upwardly extending stud 29 is used that extends within the spring F. Similarly, the bracket 16 is provided with a flanged enlargement 30 to form the upper bearing for the spring F and a centering stud 31.

In actual practice, the spring F will be under an initial compression in normal position of the vehicle parts. As the chassis and axle approach each other, it is evident that the plunger A will be further telescoped within the split sleeve 20—20ª and at the same time, the spring F will be put under further compression, thereby automatically increasing the clamping pressure of the clamping blocks C—C' on the split sleeve 20—20ª and of the latter in turn on the plunger A. The nearer the chassis and axle approach each other, the greater the friction that will be created, as will be apparent, and the friction will be graduated in accordance with the varying positions of the chassis and axle.

I claim:

1. In a shock absorber for vehicles and the like and adapted to be interposed between the axle and chassis, the combination with slidably engageable elements arranged for relative movements in accordance with the relative movements of the axle and chassis; of clamping means associated with said elements, said clamping means including a link and friction blocks, said link being pivotally attached to one of said friction blocks; and means for varying the pressure of said clamping means on said elements and actuated upon relative movement between the chassis and axle from normal position.

2. In a shock absorber for automobiles and the like and adapted to be interposed between the axle and chassis, the combination with two elements relatively slidable in frictional engagement, of separate clamping blocks located exteriorly of said elements, and spring-actuated means for varying the pressure of said clamping blocks, said spring-actuated means being arranged to vary the clamping pressure in accordance with the relative movements of the axle and chassis.

3. In a shock absorber for vehicles and the like and adapted to be interposed between the axle and chassis, the combination with two telescoped elements, one of which is movable in unison with the axle and the other in unison with the chassis, of external clamping means associated with said elements, and means for varying the pressure of said clamping means on said elements upon relative movement between the chassis and axle.

4. In a shock absorber for vehicles and the like, the combination with two telescoped elements in slidable frictional engagement, of clamping blocks located exteriorly of said telescoped elements, and spring-actuated means for varying the pressure of said separate clamping blocks, the pressure being variable in accordance with the relative movement between the two members adapted to be cushioned by the shock absorber.

5. In a shock absorber of the character described, the combination with a plunger adapted to be secured to one member of a vehicle, of a split sleeve within which said plunger is telescoped, said split sleeve being adapted to be secured to another member of the vehicle, clamping blocks on the outer sides of said split sleeve, and spring-actuated means for varying the pressure of said clamping blocks dependent upon relative movement between the plunger and split sleeve.

6. In a shock absorber of the character described, the combination with a plunger adapted to be secured to one member of a vehicle, of a split sleeve within which said plunger is telescoped, said split sleeve being adapted to be secured to another member of the vehicle, clamping blocks on the outer sides of said split sleeve, and spring-actuated means for varying the pressure of said clamping blocks dependent upon relative movement between the plunger and split sleeve, said means including a spring, a bell-crank, against one arm of which said spring reacts, and link connections between the other arm of said bell-crank and one of said clamping blocks, said bell-crank being pivoted to the other of said clamping blocks.

In witness that I claim the foregoing I have hereunto subscribed my name this 14th day of Feb., 1918.

JOHN F. O'CONNOR.